(12) United States Patent
Wernet et al.

(10) Patent No.: US 10,422,680 B2
(45) Date of Patent: Sep. 24, 2019

(54) METHOD FOR MONITORING AT LEAST ONE MEDIA-SPECIFIC PROPERTY OF A MEDIUM

(71) Applicant: Endress + Hauser GmbH + Co. KG, Maulburg (DE)

(72) Inventors: Armin Wernet, Rheinfelden (DE); Gerd Bechtel, Steinen (DE); Kaj Uppenkamp, Wehr (DE); Franco Ferraro, Schworstadt (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 0 days.

(21) Appl. No.: 14/889,255

(22) PCT Filed: Apr. 22, 2014

(86) PCT No.: PCT/EP2014/058047
§ 371 (c)(1),
(2) Date: Nov. 5, 2015

(87) PCT Pub. No.: WO2014/180649
PCT Pub. Date: Nov. 13, 2014

(65) Prior Publication Data
US 2016/0116322 A1 Apr. 28, 2016

(30) Foreign Application Priority Data

May 8, 2013 (DE) .......................... 10 2013 104 781

(51) Int. Cl.
*G01F 23/26* (2006.01)
*G01F 23/24* (2006.01)

(52) U.S. Cl.
CPC ............ *G01F 23/263* (2013.01); *G01F 23/24* (2013.01); *G01F 23/26* (2013.01)

(58) Field of Classification Search
CPC ....................... G01F 23/263; G01F 23/24–268
See application file for complete search history.

(56) References Cited

U.S. PATENT DOCUMENTS 4,125,822 A * 11/1978 Perren ................... G01M 3/045
324/696
4,945,863 A * 8/1990 Schmitz ............ G01N 33/2852
123/1 A (Continued)

FOREIGN PATENT DOCUMENTS

DE       3212434 C2   10/1983
DE       19808940 A1  10/1998

(Continued)

OTHER PUBLICATIONS

English Translation of International Preliminary Report on Patentability, WIPO, Geneva, dated Nov. 19, 2015.

(Continued)

*Primary Examiner* — Peter J Macchiarolo
*Assistant Examiner* — Alexander A Mercado
(74) *Attorney, Agent, or Firm* — Bacon & Thomas, PLLC

(57) ABSTRACT

A method and an apparatus for monitoring at least one media-specific property of a medium in automation technology with a measuring probe, wherein the at least one media-specific property is ascertained in a conductive operating mode and in a capacitive operating mode of the measuring probe. The conductive operating mode and the capacitive operating mode are operated alternately, wherein based on the measured values, which are ascertained in at least one of the two operating modes, it is checked, whether the at least one media-specific property to be monitored lies within a predetermined tolerance band, and wherein a report and/or a switching signal is generated, when the at least one (Continued)

media-specific property to be monitored lies outside of the predetermined tolerance band.

12 Claims, 4 Drawing Sheets

(56) References Cited

U.S. PATENT DOCUMENTS

| | | | | |
|---|---|---|---|---|
| 5,736,637 | A * | 4/1998 | Evans | E21B 47/102 |
| | | | | 73/152.18 |
| 5,992,231 | A * | 11/1999 | Mulder | G01F 23/24 |
| | | | | 73/304 C |
| 6,481,276 | B1 * | 11/2002 | Neuhaus | G01F 23/00 |
| | | | | 340/618 |
| 6,482,017 | B1 | 11/2002 | Van Doorn | |
| 6,823,271 | B1 * | 11/2004 | Foss | G01F 1/74 |
| | | | | 702/50 |
| 6,885,199 | B2 | 4/2005 | Desmier et al. | |
| 6,927,583 | B2 * | 8/2005 | Vanzuilen | G01N 27/226 |
| | | | | 324/686 |
| 7,415,366 | B2 * | 8/2008 | Florenz | G01D 3/02 |
| | | | | 702/50 |
| 7,946,148 | B2 | 5/2011 | Getman et al. | |
| 9,146,145 | B2 | 9/2015 | Wernet et al. | |
| 2003/0020494 | A1 * | 1/2003 | Desmier | G01N 27/228 |
| | | | | 324/667 |
| 2003/0117153 | A1 * | 6/2003 | McKenzie | G01N 27/226 |
| | | | | 324/663 |
| 2006/0212232 | A1 * | 9/2006 | Foss | G01F 1/74 |
| | | | | 702/50 |
| 2010/0005880 | A1 * | 1/2010 | Dieterle | G01F 23/24 |
| | | | | 73/304 R |
| 2010/0147052 | A1 * | 6/2010 | Nelson | G01N 15/0656 |
| | | | | 73/28.01 |
| 2011/0276281 | A1 * | 11/2011 | Wernet | G01F 23/241 |
| | | | | 702/55 |
| 2014/0152332 | A1 * | 6/2014 | Platte | G01N 27/07 |
| | | | | 324/713 |
| 2014/0339919 | A1 * | 11/2014 | Wernet | G01F 23/2967 |
| | | | | 307/116 |
| 2015/0002178 | A1 * | 1/2015 | Herb | G01N 27/02 |
| | | | | 324/693 |
| 2016/0018248 | A1 | 1/2016 | Wernet et al. | |

FOREIGN PATENT DOCUMENTS

| | | |
|---|---|---|
| DE | 10037715 A1 | 2/2002 |
| DE | 10343751 A1 | 5/2004 |
| DE | 102004047413 A1 | 3/2006 |
| DE | 102006047780 A1 | 4/2008 |
| DE | 102008043412 A1 | 5/2010 |
| DE | 102010038535 A1 | 2/2012 |
| DE | 102011087230 A1 | 5/2013 |
| DE | 102013102055 A1 | 9/2014 |
| WO | 02093150 A1 | 11/2002 |
| WO | 2009027782 A1 | 3/2009 |

OTHER PUBLICATIONS

International Search Report EPO, The Netherlands, dated Aug. 6, 2014.
German Search Report, German PTO, Munich, dated Nov. 5, 2013.

* cited by examiner

METHOD FOR MONITORING AT LEAST ONE MEDIA-SPECIFIC PROPERTY OF A MEDIUM

TECHNICAL FIELD

The invention relates to a method and an apparatus for monitoring at least one media-specific property of a medium in automation technology using a measuring probe.

BACKGROUND DISCUSSION

Known from German Patent DE 32 12 434 C2 is to monitor the fill level of a medium by detecting whether an electrical contact is present via the conductive medium between a sensor electrode and the wall of a conductive container or a second electrode. Since, as a function of the medium to be monitored, accretions often form on the measuring probe, a guard electrode is used. Such surrounds the sensor electrode coaxially and lies at the same electrical potential as the sensor electrode. Depending on the character of the accretion, this embodiment has the problem of suitably producing the guard signal.

In German Patent DE 10 2006 047 780 A1, a fill level measuring probe is described, which over a large measuring range is insensitive to accretion formation. In the known solution, an amplifying unit and a limiting element are provided, wherein the limiting element is arranged between the output of the amplifying unit and the guard electrode. The guard electrode is supplied with a guard signal via the amplifying unit and the limiting element, which is e.g. an ohmic resistance. The sensor electrode is supplied analogously with the operating signal. An evaluation unit monitors the fill level based on the electrical current signal tappable on the sensor electrode and the operating signal and/or the guard signal. The amplifying unit, which produces the guard signal, is limited by the limiting element. The signal limited in its amplitude is given to the sensor electrode as exciter signal. Tapped from the sensor electrode is then an electrical current signal, which in combination with the operating signal or the guard signal is taken into consideration for the purpose of monitoring the fill level.

Known from German Patent DE 10 2008 043 412 A1 is a fill level switch having a memory unit, wherein stored in the memory unit are limit values for different media located in a container. In the case of exceeding or subceeding the limit value matched to the medium, a switching signal is produced. Especially, the limit value for the measured value can be so established in reference to the medium located in the container that accretion formation does not influence reliable switching. Since accretion formation corrupts the measurement signal and, thus, falsely indicates an incorrect process variable, the limit value (which determines the switching point) is preferably so placed that it lies outside of the range for the measurement signal, which is attainable because of the accretion. The apparatus can, in such case, be embodied as a capacitive or as a conductive, fill-level measuring device. Since the apparatus can automatically adjust to alternating media (e.g. in the context of cleaning procedures such as CIP and SIP processes) in the container by ascertaining, respectively calculating, the optimal switching point from the registered properties of the medium, complex adjustment procedures, which usually are necessary in the case of an alternation of the medium, can be omitted.

Fill level detection by means of a conductive measuring method reaches its limits when the medium to be monitored has virtually no electrical conductivity (<1 µS/cm) or only a very low conductivity. A change of the conductivity of the medium relative to the conductivity of air is then too small, in order still safely to be able to be registered by the measuring electronics. Media difficult to be monitored with a conductive measuring method include e.g. distilled water, molasses and alcohols. Still problematic are media with an electrical conductivity of less than 1 µS/cm and a dielectric constant (DK) of less than 20. Falling in these regions are especially oils and fats.

Described in German Patent DE 102013102055.0, filed on Mar. 1, 2013, published on Sep. 18, 2014, is a method for monitoring a predetermined fill level of a medium in a container. The method includes the following method steps: a fill level measuring probe is operated in a conductive operating mode as the conductive fill level measuring probe and in a capacitive operating mode as a capacitive fill level measuring probe; the conductive operating mode and the capacitive operating mode are alternately operated; based on the measured values of the two operating modes, it is ascertained, whether the predetermined fill level of the medium in the container has been achieved; a report is generated, when the predetermined fill level is exceeded and/or subceeded.

SUMMARY OF THE INVENTION

An object of the invention is to provide a method and an apparatus, which permit the monitoring of a media-specific process variable and therewith the monitoring and/or control of a process occurring in automation technology.

The object is achieved, as regards the method aspect of the invention, by method steps as follows: the at least one media-specific property is ascertained in a conductive operating mode and in a capacitive operating mode of the measuring probe; the conductive operating mode and the capacitive operating mode are operated alternately; based on the measured values, which are ascertained in at least one of the two operating modes, it is checked, whether the at least one media-specific property to be monitored lies within a predetermined tolerance band; a report and/or a switching signal are/is generated, when the at least one media-specific property to be monitored lies outside of the predetermined tolerance band. The media-specific property is especially the electrical conductivity and/or the dielectric constant. The conductive measuring method is applied in the case of conductive media, while the capacitive measuring method is applied in the case of non-conductive or poorly conductive media.

According to the invention, thus, the advantages of the conductive measuring method and the advantages of the capacitive measuring method can be combined. In this way, the ability is present to provide information concerning the media-specific property reliably over an expanded range of media. The application range of the measuring device is thereby significantly enlarged. In such case, it should be mentioned that the advantages and disadvantages of the conductive measuring method and of the capacitive measuring method are opposite in critical regions and, thus, largely compensate one another. Especially, it is possible, by means of the method of the invention, safely to monitor the media-specific property, respectively the process, even though the dielectric constant is greater than 1.5.

A conductive measuring method is preferably used for monitoring media when the media to be monitored have an electrical conductivity >5 µS/cm. The advantage of the conductive measuring method is that the sensor electrodes can have a direct connection to the medium. An insulating of the sensor electrodes is not required.

A disadvantage of the capacitive measuring method is that in the case of media with increased electrical conductivity an insulation is required between the sensor electrode and the medium. The impedance of the insulation is disadvantageous, as soon as accretion formation occurs. The method of the invention provides the opportunity significantly to expand the range, in which a reliable monitoring of a media-specific property, respectively of the process, is possible.

In an advantageous embodiment of the method of the invention, the at least one media-specific property is ascertained in the conductive operating mode. If the medium to be monitored is a non-conductive medium or medium with a low conductivity, the measured values are taken, which are ascertained in the capacitive operating mode. If, in contrast, the medium to be monitored is a medium with an easily measurable, higher electrical conductivity, then the measured values are taken, which are won in the conductive operating mode. If the medium to be monitored is a medium with a conductivity in a transitional region, measured values are taken, which are ascertained in the capacitive operating mode and in the conductive operating mode. Then, the measured values ascertained in the capacitive operating mode are compared with the measured values won in the conductive operating mode. Based on the comparison, a plausibility check is performed.

Via an external interface, e.g. a Profibus interface, a magnetic interface, such as described in German Patent DE 10 2011 087 230.2 of the applicant, filed on the Nov. 28, 2011, and published on May 29, 2013, or a worldwide standardized 10-technology, such as described in IEC 61131-9, the opportunity is provided to monitor the medium located in the container relative to at least one of its media-specific properties and to provide corresponding information to the user. Furthermore, it is also possible under certain circumstances supplementally to conduct a limit-level monitoring of the medium in the container. In such case, it is to be noted that a monitoring of at least one of the media-specific properties is only possible, when the measuring probe is in contact with the medium, thus covered with the medium. Additionally in this state, then also the reaching of the predetermined fill level can be signaled.

In an advantageous embodiment of the method of the invention, it is provided that at least one process specific property is monitored using the ascertained media-specific property(ies). Preferably, the process-specific property of the medium is the already earlier mentioned, predetermined fill level, upon the reaching of which e.g. a switching procedure is performed. For example, the switching procedure turns a pump on or off.

In detail in this regard, it is provided that there is associated with the measuring probe, supplementally to the monitoring of the media-specific property, at least one switching function, with which a predetermined fill level of the medium in the container is monitored. In this connection, it is further provided that there is associated with the measuring probe at least one switching curve, which places the measured values of the measuring probe or variables derived from the measured values of the measuring probe in a functional relationship to at least one of the monitored media-specific properties of the medium, and wherein, in the case of reaching a measured value of the measuring probe predetermined by the switching curve, the subceeding and/or exceeding of a predetermined fill level of the medium in the container is signaled.

Especially advantageous in this connection is when the switching curve, respectively the switching point, for the limit level switch can be adapted by the operating personnel to the special process conditions present in the container. For example, the opportunity is provided to set the accretion sensitivity of the limit level switch individually to the present process conditions, respectively to the present application. A self generated switching curve with application-specific switching points is produced optimally matched to the particular application. This is subsequently used in the measuring probe for ascertaining the predetermined fill level, whereby the accuracy of measurement can be increased. The adapting of the switching curve occurs preferably via one of the external interfaces named above.

The object relative to the apparatus aspect of the invention is achieved by features including that a measuring probe is provided, which is so embodied that it is operable in a conductive operating mode as a conductive measuring probe and in a capacitive operating mode as a capacitive measuring probe. Furthermore, a control/evaluating/output unit is provided, which is so embodied that it alternately activates the conductive operating mode and the capacitive operating mode. Moreover, the control/evaluating/output unit checks based on the measured values ascertained in at least one of the two operating modes whether the media-specific property to be monitored lies within a predetermined tolerance band, and it generates a report, when the media-specific property to be monitored lies outside of the predetermined tolerance band.

Furthermore, it is provided that there is associated with the measuring probe a memory unit, in which information is stored, which sets the measured values of the measuring probe or variables derived from the measured values of the measuring probe in a functional relationship to at least one of the media-specific properties of the medium. Via the functional relationship, switching points for the control/evaluating/output unit are predetermined.

Preferably, the measuring probe includes a sensor electrode and a guard electrode. Furthermore, provided are a first electronics unit, which is so designed that it operates the measuring probe in the conductive operating mode, and a second electronics unit, which is so designed that it operates the measuring probe in the capacitive operating mode. Moreover, a switching unit is provided, via which the control/evaluating/output unit alternately activates the conductive operating mode and the capacitive operating mode of the measuring probe. Depending on which operating mode is turned on, the first electronics unit or the second electronics unit supplies the sensor electrode with an operating signal and the guard electrode with a guard signal. The control/evaluating/output unit ascertains, based on a resulting signal tappable on the sensor electrode and the operating signal and/or the guard signal, the exceeding and/or the subceeding of the predetermined fill level.

An advantageous embodiment of the apparatus of the invention provides that the control/evaluating/output unit ascertains at least one amplitude ratio from the guard signal and/or the operating signal and the electrical current signal and/or a voltage signal dependent on the electrical current signal and based on the amplitude ratio ascertains the exceeding or subceeding of the fill level of the medium in the container.

BRIEF DESCRIPTION OF THE DRAWINGS

The invention will now be explained in greater detail based on the appended drawing, the figures of which show as follows:

FIG. 1 is a schematic representation of an embodiment of the apparatus of the invention;

FIG. 2b is a cross section through the measuring probe shown in FIG. 2a;

DETAILED DISCUSSION IN CONJUNCTION WITH THE DRAWINGS

Figure 2A:
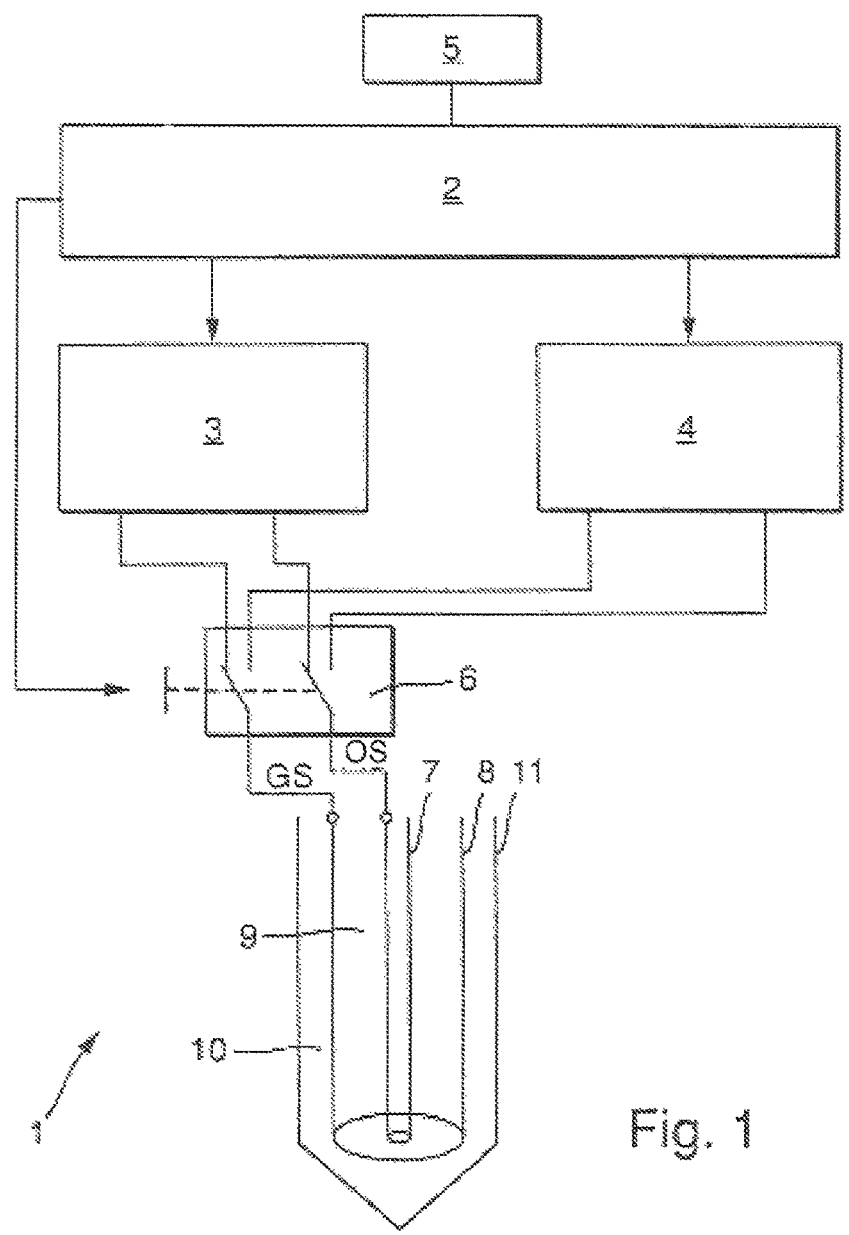
FIG. 2a in partial view, is a longitudinal section through a measuring probe of the invention.

FIG. 1 shows a schematic representation of a preferred embodiment of the apparatus of the invention for monitoring a media-specific property of a medium in a container. The apparatus of the invention includes a measuring probe 1, which is so embodied that it can be operated in a conductive operating mode as a conductive measuring probe 1 and in a capacitive operating mode I as a capacitive measuring probe 1. Via the control unit 2, which in the shown case is embodied as an integral component of a control/evaluating/output unit 2, the measuring probe 1 is controlled alternately into the conductive operating mode II and into the capacitive operating mode I. Of course, the individual components of the control/evaluating/display unit 2 also can be embodied as separate subcomponents.

Measuring probe 1 uses both for application of the conductive operating mode as well as also for application of the capacitive operating mode the same sensor electrode 7, guard electrode 8 and ground electrode 11. Preferably, the measuring probe 1 is flushly mounted or at least approximately flushly mounted arranged so on or in the container that it at least at times is in contact with the medium. Preferably, however, it is in continual contact with the medium, in order so to assure a continuous monitoring of the media-specific property. The container is provided in FIG. 1 with the reference character 11.

The applicant manufactures and sells fill level measuring probes 1 for limit level detection under the designation FTW33. These have a similar construction to that, which can be used in the case of the solution of the invention. However, these known fill level measuring probes have no switchable conductive and capacitive operating modes. Described in the patent application of the applicant, DE 10 2013 102 055.0, is a measuring probe, which shows switching between the two operating modes. However, in that case, a media-specific property of the medium is not monitored, but, instead, the measuring probe is used for limit level detection. In the context of the present invention, it is—as already mentioned above—possible to utilize limit level detection supplementally to the monitoring of the media-specific property(s). However, this is only possible in certain applications, for example, in the case of fast batch processes, in the case of which the measuring probe always re-contacts the medium at predetermined intervals.

Figure 2B:
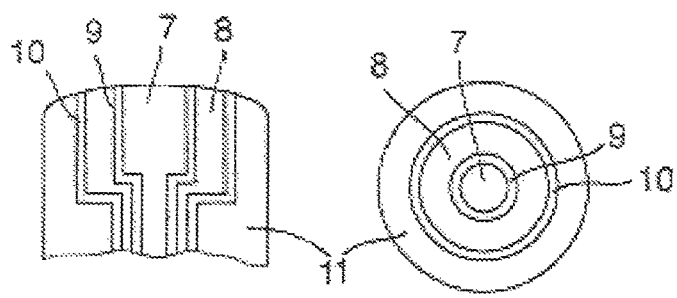

If the container is made of a conductive material—such as shown in FIG. 1—then the ground electrode 11 can be formed of the wall of the container. Of course, the ground electrode 11 can in the case of containers with a wall of a non-conductive material also be embodied as an integral component of the fill level measuring probe 1. Corresponding embodiments are shown in FIG. 1 (wall as ground electrode 11) and in FIG. 2a, FIG. 2b (ground electrode 11 as integral component of the fill level measuring probe 1). Likewise an option is to provide a separate electrode as ground-electrode.

Measuring probe 1 is operated in the conductive operating mode via a first electronics unit 3 and in the capacitive operating mode I via a second electronics unit 4.

Figure 5:
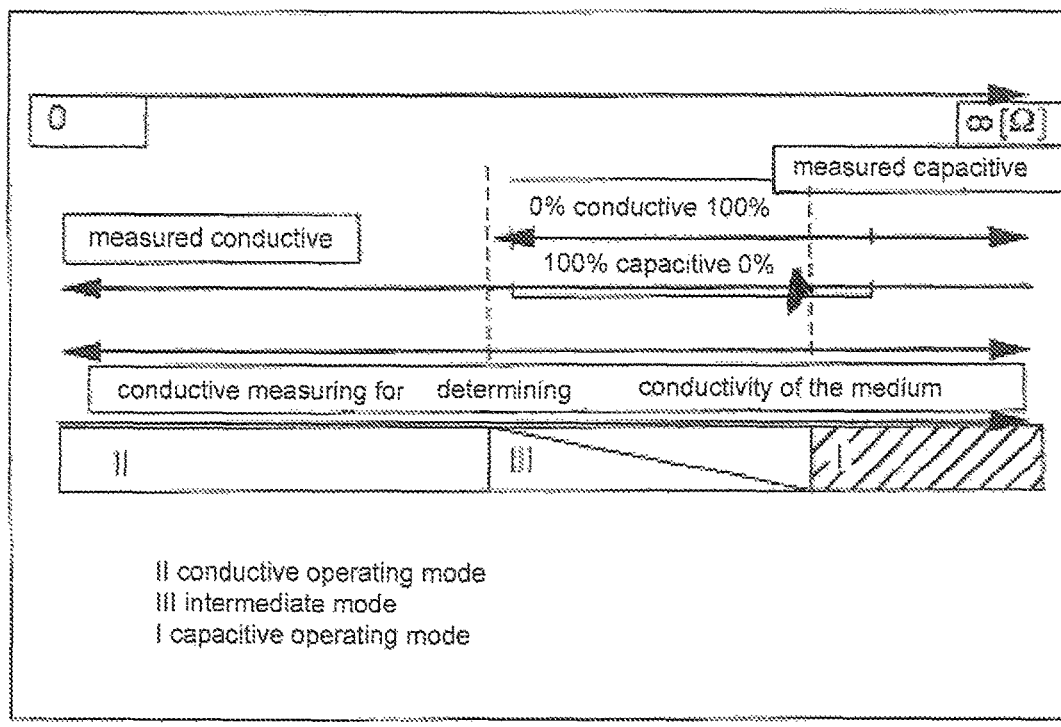
FIG. 5 is a schematic representation of the different operating modes.

The preferred alternating operating of the conductive operating mode (region II in FIG. 5) and of the capacitive operating mode (region I in FIG. 5), which is used for determining the dielectric constant (DK) of the medium, occurs via a switching unit 6. The switching unit 6 is designed either as an analog switching unit or as a digital switching unit. The operating of the measuring probe 1 occurs via the operating signal OS for the sensor electrode 7 and the guard signal GS for the guard electrode 8.

An example of an embodiment of an electronics unit 3 for a conductive fill level measuring probe 1 is implemented, for example, in the above mentioned fill level measuring probe FTW33 of the applicant, which is provided especially for use in the foods field. Suitable electronic units 3 are, moreover, known from DE 10 2006 047 780 A1 and DE 10 2008 043 412 A1. The operation of the measuring probe 1 in the conductive operating mode is described with reference to FIGS. 2 and 3 of DE 10 2006 047 780 A1. That description is expressly incorporated here into the disclosure of the present invention.

Used as electronics unit 4 for the capacitive operating mode can be, for example, an easily modified electronics, such as is used in one of the capacitive fill level measuring probes manufactured and sold by the applicant under the marks, LIQUICAP, Nivector or Minicap.

Based on the measured values, which are determined in the capacitive operating mode and in the conductive operating mode, the control/evaluating/output unit 2 ascertains the media-specific property of the medium. Then, it is checked, whether the at least one media-specific property to be monitored, especially the dielectric constant or the electrical conductivity, lies within a predetermined tolerance band specified for the process running in the container. As soon as the media-specific property to be monitored lies outside of the predetermined tolerance band, a corresponding report and/or a corresponding switching signal is generated, so that countermeasures for removing the deviation can be introduced.

Figure 4:
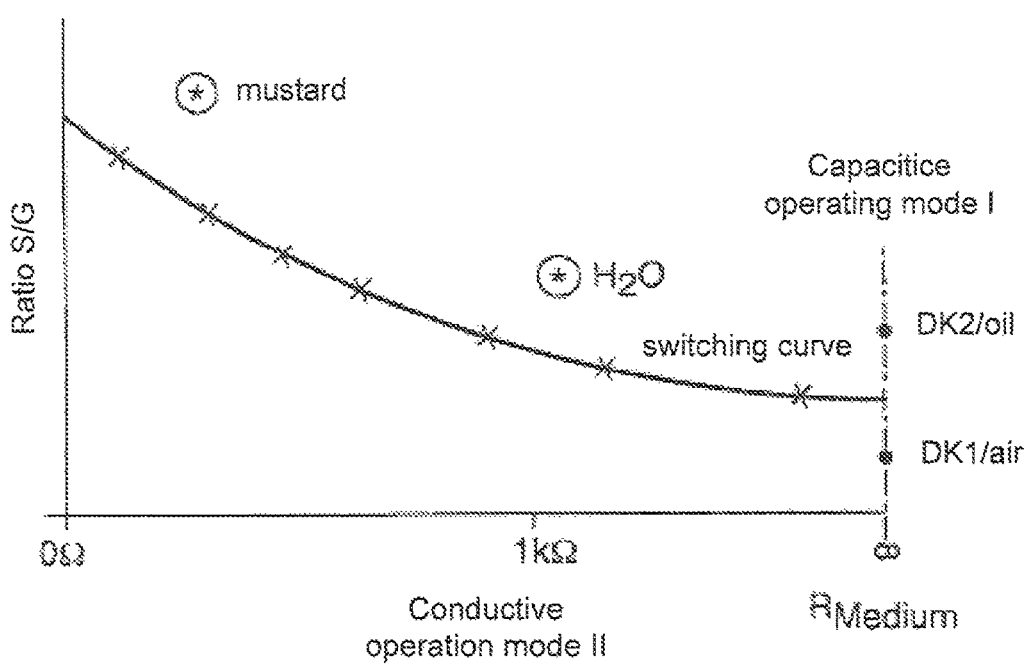
FIG. 4 is a schematic representation of a switching curve of a fill level measuring probe.

If the measuring probe is, moreover, utilized for limit level detection, then the switching point is especially dependent on the conductivity, respectively the relative dielectric constant, of the medium. At least one switching curve is stored in the memory unit 5. If e.g. the conductivity of the medium is known, then the associated optimal switching point can be ascertained based on the stored switching curve. A schematic representation of a switching curve is shown in FIG. 4. In the conductive measuring mode (first y-axis), the ratio S/G between the voltage (or current) of the sensor electrode and that of the guard electrode is computed. A further example of a switching curve applicable in connection with the solution of the invention is shown in the already cited DE 10 2006 047 780 A1. An embodiment of the solution of the invention provides that the user can vary the switching point, respectively the switching curve, within certain limits. In this way, an option is that the user can adapt the switching point, respectively the switching curve, optimally to the process running, respectively occurring, in the container.

In an advantageous embodiment, three regions I, II, III are distinguished relative to limit level detection:

In the case of non-conductive media or media with a low conductivity, measured values are taken, which are ascertained in the capacitive operating mode (region I). Preferably, region I lies in the resistance range from 300 kΩ to infinity.

In the case of media to be monitored with a high electrical conductivity, measured values are taken, which are won in the conductive operating mode (region II). Preferably, the region II lies in a resistance range from 0Ω to 1 MΩ.

In the case of media to be monitored with a conductivity in an intermediate region (III), measured values are taken, which are ascertained in the capacitive operating mode and in the conductive operating mode. As a function of the conductivity, the measured values are provided with suitable weighting factors. These weighting factors lie in the shown case both for the capacitive operating mode I as well as also for the conductive operating mode II between 0% and 100%, however, they move in opposite directions. Preferably, region III lies in a resistance range from 300 kΩ to 1 MΩ.

Based on the measured values ascertained in the capacitive operating mode and in the conductive operating mode, according to a preferred embodiment of the method of the invention, a plausibility check is performed.

Figure 3:
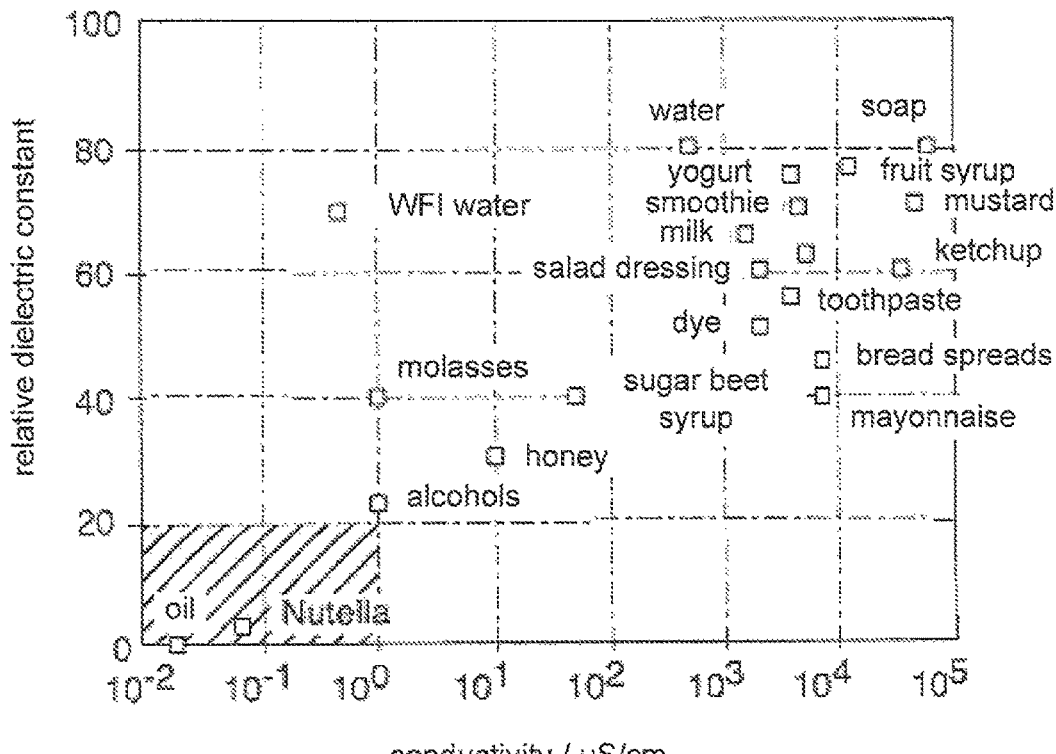
FIG. 3 is a graph, which shows relative dielectric constant of different food media as a function of electrical conductivity.

In connection with the invention, no matter what the medium is, the guard voltage is measured first in the conductive operating mode. The guard voltage describes the conductivity or the resistance of the medium. FIG. 3 shows the relative dielectric constant of various foods plotted versus conductivity. If the resistance of the medium is known, then based on FIG. 5 it is also known, in which of the three regions I, II, Ill subsequent measurements are located:

in region I, in which measured values are ascertained exclusively via the capacitive operating mode,
in region II, in which measured values are provided exclusively via the conductive operating mode, or
in intermediate region III, in which the measured values for the fill-level monitoring are formed by a suitable weighting of the measured values ascertained in the capacitive operating mode I and in the conductive operating mode II.

In the case of measurements in the conductive operating mode, the measured value is always dependent on the ratio of sensor voltage (voltage measured on the sensor electrode 7) to guard voltage (voltage measured on the guard electrode 8). In this connection, reference is made again to the disclosure of DE 10 2006 047 780 A1.

In the case of non-conductive media, measuring is performed exclusively in the capacitive operating mode. In this case, the measured value depends on the dielectric constant of the medium. Lying therebetween is a transitional region III, in which the measured values won from the conductive/capacitive operating modes are conformed and/or weighted. In order that the weighting occurs steadily and without jump, the measured values ascertained in the capacitive operating mode and in the conductive operating mode are weighted proportionally from 100 to 0%, respectively from 0% to 100%. Other information concerning this is set forth in the already mentioned DE 10 2013 102 055.0. The description of its FIGS. 6 and 7 is expressly incorporated here by reference.

Figure 6:
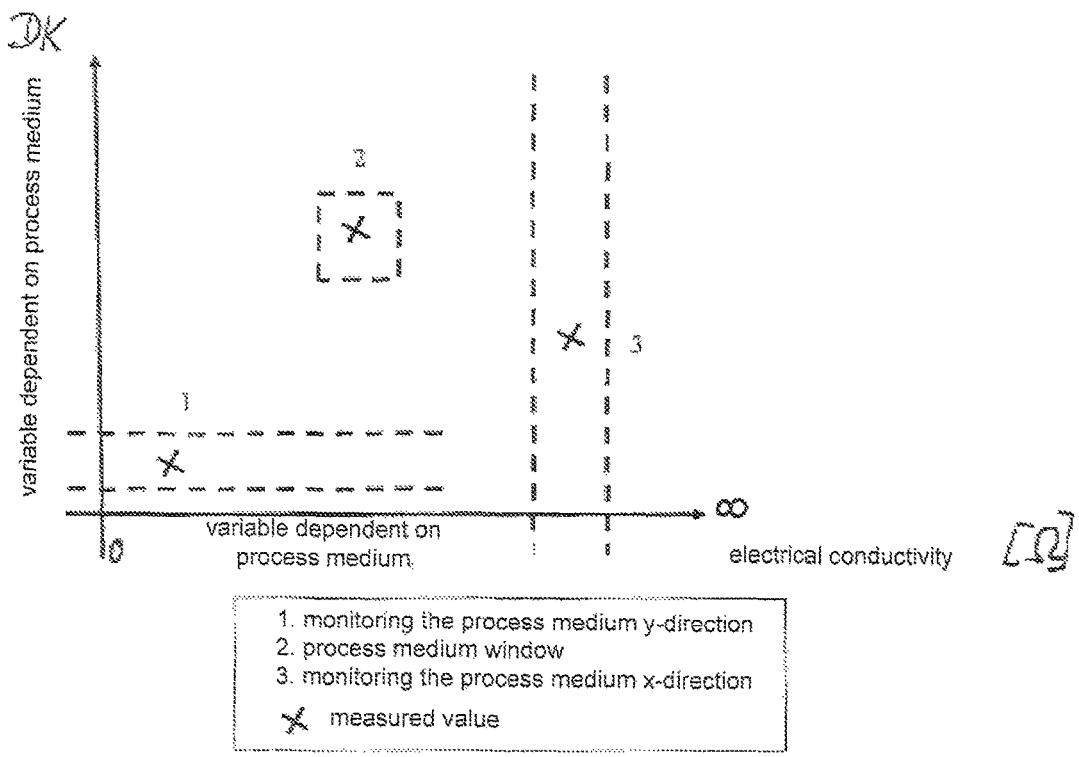
FIG. 6 is a schematic representation of different options for monitoring two different media-specific properties.

FIG. 6 shows, by way of example, different variants of how the measuring probe monitors media-specific properties in the case of a process running in a container. The process is, for example, a fermentation process.

Plotted on the x-axis in the illustrated case is the electrical conductivity of the medium. In the case of non-conductive media, a monitoring of the electrical conductivity is not possible. Then the sensible alternative is to monitor the dielectric constant. This is plotted on the y-axis in the illustrated case. The reference character A designates by way of example a variant, in the case of which the media-specific property, electrical conductivity of a conductive medium in the container (y-direction), is monitored. The tolerance band is indicated with two dashed, parallel lines. So long as the measured values X lie within the tolerance band, the process to be monitored in the container is running correctly. If the measured values leave the tolerance band, then a corresponding alarm signal or a switching signal is produced. The process must then be corrected, automatically or manually.

The reference character C shows a variant, in the case of which a media-specific property of a non-conductive medium (x-direction) is monitored. The media property to be monitored is the dielectric constant. The tolerance band is again indicated with two dashed, parallel lines. So long as the measured values X lie within the tolerance band, the process to be monitored in the container is running correctly. If the measured values leave the tolerance band, then a corresponding alarm signal or a switching signal is produced. The process must then be corrected, automatically or manually.

The reference character B shows a variant, in the case of which two media-specific properties—the dielectric constant and the electrical conductivity—are monitored simultaneously. The monitoring occurs both in the x-direction as well as also in the y-direction. The tolerance band is reduced, in this case, to a tolerance window, which is indicated by four mutually perpendicular lines. So long as the measured values X lie within the tolerance window, the process to be monitored in the container is running correctly. If the measured values leave the tolerance window, then a corresponding alarm signal or a switching signal is produced. The process must then be corrected, automatically or manually.

The invention claimed is:

1. A method for monitoring at least an electrical conductivity and/or a dielectric constant of a medium involved in a process in a container in automation technology with a measuring probe, comprising:

ascertaining a value of the electrical conductivity in a conductive operating mode or both the conductive operating mode and a capacitive operating mode of the measuring probe, and/or ascertaining a value of the dielectric constant in the capacitive operating mode of the measuring probe, wherein:

in the case of non-conductive media to be monitored or media with a conductivity that is lower than a first threshold, the value of the dielectric constant is ascertained in the capacitive operating mode;

in the case of media to be monitored having an electrical conductivity that exceeds a second threshold, the value of the conductivity is ascertained in the conductive operating mode;

in the case of media to be monitored having a conductivity in a transitional region between the first threshold and the second threshold, the values of conductivity are ascertained in the capacitive operating mode and in the conductive operating mode by weighting the conductivities determined in both the capacitive and conductive operating modes;

operating the conductive operating mode and the capacitive operating mode alternately;

performing a plausibility check by checking based on the values for the electrical conductivity and/or the dielectric constant, ascertained in at least one of the two operating modes, whether the electrical conductivity and/or the dielectric constant lies within a predetermined tolerance band specified for the process;

generating a report and/or a switching signal, when the electrical conductivity and/or the dielectric constant lies outside of the predetermined tolerance band; and when the values for the electrical conductivity and/or the dielectric constant of the medium lie within the predetermined tolerance band, performing the process involving the medium located in the container while monitoring at least a predetermined fill level of the medium by operating the measuring probe as a conductive and/or capacitive measuring probe depending on the values for the electrical conductivity and/or the dielectric constant.

2. The method as claimed in claim 1, wherein in the transitional region, the values ascertained in the capacitive operating mode, are compared with the values ascertained in the conductive operating mode; and the plausibility check is performed based on the comparison.

3. The method as claimed in claim 1, wherein:

there is associated with the measuring probe a switching function for monitoring the predetermined fill level of the medium in the container.

4. The method as claimed in claim 3, wherein supplementally to monitoring the fill level by operating the probe as a conductive and/or capacitive measuring probe depending on the values for the electrical conductivity and/or the dielectric constant, the predetermined fill level is monitored based on the switching function according to which at least one switching curve is associated with the measuring probe, the switching function placing ascertained values of the measuring probe or variables derived from the ascertained values of the measuring probe in a functional relationship to at least the electrical conductivity and/or the dielectric constant of the medium; and in the case of reaching a measured value of the measuring probe predetermined by the switching curve, a subceeding and/or exceeding of the predetermined fill level of the medium in the container is signaled.

5. The method as claimed in claim 4, wherein the switching curve is so adapted by the operating personnel that it is optimized to process conditions reigning in the container.

6. An apparatus for monitoring an electrical conductivity and/or a dielectric constant of a medium involved in a process in a container, comprising:

a measuring probe, which is so embodied that it is operated in a conductive operating mode as a conductive measuring probe and in a capacitive operating mode as a capacitive measuring probe;

a control/evaluating/output unit, which is so embodied that it ascertains a value for the electrical conductivity in the conductive operating mode or in both the conductive operating mode and in the capacitive operation mode, and/or ascertains a value of the dielectric constant in the capacitive operating mode, and that it alternately activates the conductive operating mode and the capacitive operating mode, wherein:

in the case of non-conductive media to be monitored or media with a conductivity that is lower than a first threshold, the control/evaluating/output unit ascertains the value of the dielectric constant in the capacitive operating mode;

in the case of media to be monitored having an electrical conductivity that exceeds a second threshold, the control/evaluating/output unit ascertains the value of the conductivity in the conductive operating mode;

in the case of media to be monitored having a conductivity in a transitional region between the first threshold and the second threshold, the control/evaluating/output unit ascertains the values of conductivity in the capacitive operating mode and in the conductive operating mode by weighting the conductivities determined in both the capacitive and conductive operating modes;

wherein said control/evaluating/output unit performs a plausibility check by checking, based on the values for the electrical conductivity and/or the dielectric constant ascertained in at least one of the two operating modes, whether the electrical conductivity and/or the dielectric constant lies within a predetermined tolerance band specified for the process, and generates a report, when the electrical conductivity and/or the dielectric constant lies outside of the predetermined tolerance band, and when the values for the electrical conductivity and/or the dielectric constant of the medium lies within the predetermined tolerance band, monitors a fill level of the medium located in the container by operating the measuring probe as a conductive and/or capacitive measuring probe depending on values for the electrical conductivity and/or the dielectric constant.

7. The apparatus as claimed in claim 6, wherein:

there is associated with the measuring probe a memory unit, in which information is stored, which places ascertained values of the measuring probe or variables derived from the measured values of the measuring probe in a functional relationship to the electrical conductivity and/or the dielectric constant of the medium, and via the functional relationship, switching points for the control/evaluating/output unit are predetermined.

8. The apparatus as claimed in claim 6, wherein:

said measuring probe includes a sensor electrode and a guard electrode, a first electronics unit is provided, which is so designed that it operates said measuring probe in the conductive operating mode, wherein a second electronics unit is provided, which is so designed that it operates said measuring probe in the capacitive operating mode, and a switching unit is provided, via which the said control/evaluating/output unit alternately activates the conductive operating mode and the capacitive operating mode of the measuring probe.

9. The apparatus as claimed in claim 8, wherein:

depending on which whether the conductive operating mode or the capacitive operation mode is turned on, said first electronics unit or said second electronics unit supplies said sensor electrode with an operating signal and a guard electrode with a guard signal.

10. The apparatus as claimed in claim 9, wherein:

said control/evaluating/output unit ascertains based on a resulting tappable signal on said sensor electrode and the operating signal and/or the guard signal an exceeding and/or subceeding of a predetermined fill level.

11. The apparatus as claimed in claim 9, wherein:

said control/evaluating/output unit ascertains at least one amplitude ratio from the guard signal and/or the operating signal and an electrical current signal and/or a voltage signal dependent on the electrical current signal and based on said amplitude ratio ascertains the exceeding or subceeding of the fill level of the medium in the container.

12. The apparatus as claimed in claim 6, wherein in the transitional region, the values ascertained in the capacitive operating mode, are compared with the values ascertained in the conductive operating mode; and the plausibility check is performed based on the comparison.

* * * * *